United States Patent
Lin et al.

(10) Patent No.: US 8,379,146 B2
(45) Date of Patent: Feb. 19, 2013

(54) DEINTERLACING METHOD AND APPARATUS FOR DIGITAL MOTION PICTURE

(75) Inventors: Hua-Sheng Lin, Taipei (TW); Jiunn-Shyang Wang, Taipei (TW); Sheng-Che Tsao, Taipei (TW)

(73) Assignee: Via Technologies, Inc., Taipei (TW)

( * ) Notice: Subject to any disclaimer, the term of this patent is extended or adjusted under 35 U.S.C. 154(b) by 1446 days.

(21) Appl. No.: 11/774,568

(22) Filed: Jul. 7, 2007

(65) Prior Publication Data

US 2008/0231747 A1    Sep. 25, 2008

(30) Foreign Application Priority Data

Mar. 23, 2007   (TW) ................................ 96110050 A

(51) Int. Cl.
*H04N 7/01*    (2006.01)
(52) U.S. Cl. .................................... 348/448; 375/240.16
(58) Field of Classification Search .......... 348/448–452; 375/240.01, 240.16
See application file for complete search history.

(56) References Cited

U.S. PATENT DOCUMENTS

| | | | | |
|---|---|---|---|---|
| 6,414,719 B1 * | 7/2002 | Parikh | ............................ | 348/448 |
| 6,459,455 B1 * | 10/2002 | Jiang et al. | ..................... | 348/452 |
| 6,873,657 B2 * | 3/2005 | Yang et al. | ............... | 375/240.16 |
| 7,339,626 B2 * | 3/2008 | Jiang et al. | ..................... | 348/448 |
| 7,557,861 B2 * | 7/2009 | Wyman | ......................... | 348/441 |
| 7,570,819 B2 * | 8/2009 | Sung et al. | ..................... | 382/232 |
| 8,004,614 B2 * | 8/2011 | Wyman et al. | ................ | 348/701 |
| 2006/0227242 A1 * | 10/2006 | Chao | ............................. | 348/452 |
| 2007/0200950 A1 * | 8/2007 | Bae | .............................. | 348/452 |
| 2008/0056381 A1 * | 3/2008 | Sung et al. | ............... | 375/240.26 |
| 2008/0165278 A1 * | 7/2008 | Zhang | ........................... | 348/452 |

FOREIGN PATENT DOCUMENTS

JP              09224223 A   *   8/1997

* cited by examiner

*Primary Examiner* — Annan Shang
(74) *Attorney, Agent, or Firm* — Perkins Coie LLP; Aaron Wininger

(57) ABSTRACT

A deinterlacing method for a digital motion picture is provided. The method includes determining if a predicted pixel lies in an artificial horizontal line or not according to the relationship among a first pixel value, a second pixel value, a first threshold value and a second threshold value; and estimating the predicted pixel value in a still image manner if the predicted pixel is determined to lie in an artificial horizontal line. The present invention also includes an apparatus implementing the deinterlacing method.

16 Claims, 6 Drawing Sheets

DEINTERLACING METHOD AND APPARATUS FOR DIGITAL MOTION PICTURE

BACKGROUND OF THE INVENTION

1. Field of the Invention

The present invention is related to a video signal processing method and apparatus, and more particularly to a deinterlacing method and apparatus for a digital motion picture.

2. Description of the Prior Art

Motion video pictures, based on the sequence of images contained therein, can be represented by using two different ways: progressive and interlaced techniques. The essential difference between the two techniques lies in the sampling timing of scan lines.

With progressive video, all of the pixels (picture elements) constituting a frame (i.e. one video image snapshot within the sequence of video images) of a video image are sampled at the same time. While with interlaced video, alternate lines of the video image are sampled at alternate time. The captured video image using the interlaced video technique results in the creation of two half-frames, referred to as "fields," which together constitute a single frame in the video sequence. One field is commonly referred to as an even field, and the other field is commonly referred to as an odd field. These two fields together constitute a single frame in a video sequence and generally include the same number of scan lines respectively. Conventional televisions and video recorders are example devices that manipulate image sequences using the interlaced technique, while modern computer monitors and some DVD players are devices that manipulate image sequences using the progressive technique.

In practice, some applications require that interlaced video image sequences be processed and displayed using a device that is configured to handle only progressive image sequences. These applications therefore require that the image sequence be converted from interlaced format to progressive format. This process is typically referred to as "deinterlacing". A deinterlacing method for a digital motion picture generally tries to interpolate all values of new pixels lying in new scan lines between all adjacent scan lines in the original field (either even or odd) to get a new field. These new pixels, new scan lines and the new field will be hereinafter referred to as the predicted pixels, the predicted scan lines and the predicted field respectively. To determine the values of the predicted pixels, it typically determines in advance that each predicted pixel is located on a moving object (with dynamic pixels) or on a still object (with static pixels). When a predicted pixel is located on a moving object, a method called Bob is usually applied to interpolate the value of the predicted pixel by referencing the values of one or more spatially adjacent pixels in the same original field. When the predicted pixel is located on a still object, a method called Weave is usually applied to interpolate the value of the predicted pixel by collectively referencing the values of pixels in fields with adjacent temporal sequences. As all the predicted pixels, and thus all the predicted scan lines, on the predicted field are determined, the predicted field can be combined with an original field to form a complete non-interlaced (or progressive) frame. It is also noted that, if the original field to be combined with is an even (respectively odd) field, then the predicted field is an odd (respectively even) field.

FIG. 1 shows a block diagram of a conventional deinterlacing apparatus 100 for a digital motion picture, in which the Bob/Weave detection unit 120 uses a threshold value and the relationship between pixel values of the previous field (scan lines therein are stored in the scan line buffer 110) and the current field (stored in the video frame buffer 900) to determine that the predicted pixels are dynamic or static. Such design providing only one threshold value does not take into account the case that a scene may contain artificial lines (such as the lines constructing an artificial scoreboard for a ball game), and fails to provide any detection mechanism for selecting either a Bob or a Weave manner in advance, therefore the overall deinterlacing performance is limited for dynamic motion pictures. For example, due to the difficulty of being correctly detected by using only one threshold value, some artificial horizontal lines in a scene tends to be misjudged as points lying on a dynamic object and thus the associated predicted scan lines will be computed based on a dynamic manner, which generally causes some horizontal lines disappearing in the predicted field.

Other deinterlacing methods or apparatuses for a digital motion picture have been provided. For example, U.S. Pat. No. 6,414,719 provided methods and apparatus for interlace to progressive conversion by using a median filter and alleged that it is capable of obtaining interpolated fields more approximate to the original image. However, the operation of such methods is so complicated that it will generally occupy more system resources, such as memory space and computation time.

In view of the shortcomings of the prior technology mentioned above, there is a need to provide an improved deinterlacing method and apparatus for a digital motion picture to resolve problems such as the disappearing of artificial horizontal lines, bad performance on motion pictures, and occupying too many system resources.

SUMMARY OF THE INVENTION

One object of the present invention is to provide a deinterlacing method and apparatus for a digital motion picture, the method and apparatus being capable of correctly detecting artificial horizontal lines without misjudging them as dynamic objects and having better performance in dynamic scene. The present invention is also capable of achieving the object by using less system resources.

According to the objects mentioned above, the present invention provides a deinterlacing method for a digital motion picture, which includes determining if a predicted pixel lies in an artificial horizontal line according to a relationship among a first pixel value, a second pixel value, a first threshold value and a second threshold value, the first pixel and the second pixel respectively lying in a first field and a second field which are in an interlace relationship and in adjacent temporal sequences, and the first threshold value being greater than the second threshold value; and computing a luminance value of the predicted pixel in a still manner if the predicted pixel is determined to lie in the artificial horizontal line, in which the predicted pixel lies in a predicted field which is combined with the second field to form a new non-interlaced frame, and in which the first pixel, the second pixel and the predicted pixel all have the same or neighbor field coordinates.

The present invention also provides a deinterlacing apparatus for a digital motion picture, the apparatus including an artificial horizontal line detection unit, a scan line buffer, and a processing unit. The artificial horizontal line detection unit is configured to determine if a predicted pixel lies in an artificial horizontal line or not according to a relationship among a first pixel value, a second pixel value, a first threshold value and a second threshold value; the scan line buffer is configured to store a scan line including the first pixel; and the processing unit is configured to compute a luminance value of the predicted pixel in a still manner when the artificial horizontal line detection unit determines that the predicted pixel lies in the artificial horizontal line.

BRIEF DESCRIPTION OF THE DRAWINGS

The nature of this invention, as well as other objects and advantages thereof, will be explained in the following with reference to the accompanying drawings, in which.

DETAILED DESCRIPTION OF THE INVENTION

A deinterlacing method typically aims to determine luminance values of predicted pixels in a predicted field. Using the method to get the luminance values of all pixels in the predicted field accordingly deinterlaces an interlaced field to form a complete frame. In the following description, the luminance value of a pixel may be referred as the pixel value. The difference between two pixel values means the absolute value of the outcome of the subtraction of the two pixel values, i.e., the outcome of subtracting the smaller one from the larger one.

Figure 1:
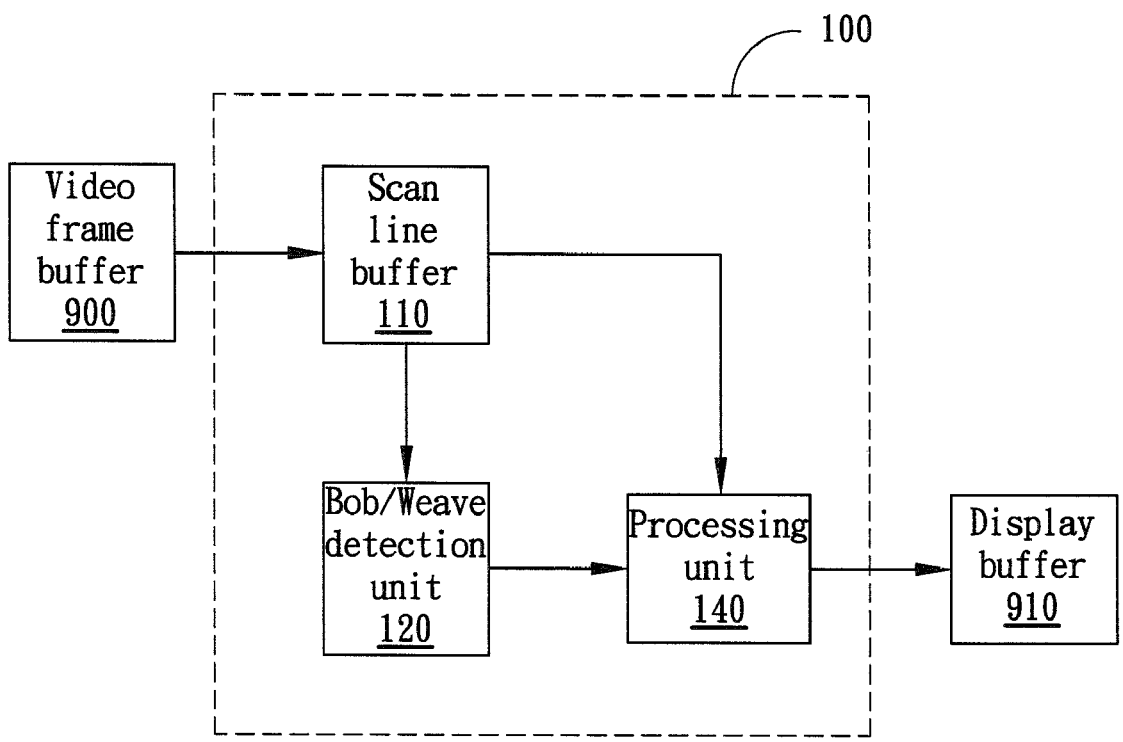
FIG. 1 shows a block diagram of a conventional deinterlacing apparatus for a digital motion picture.
Figure 2:
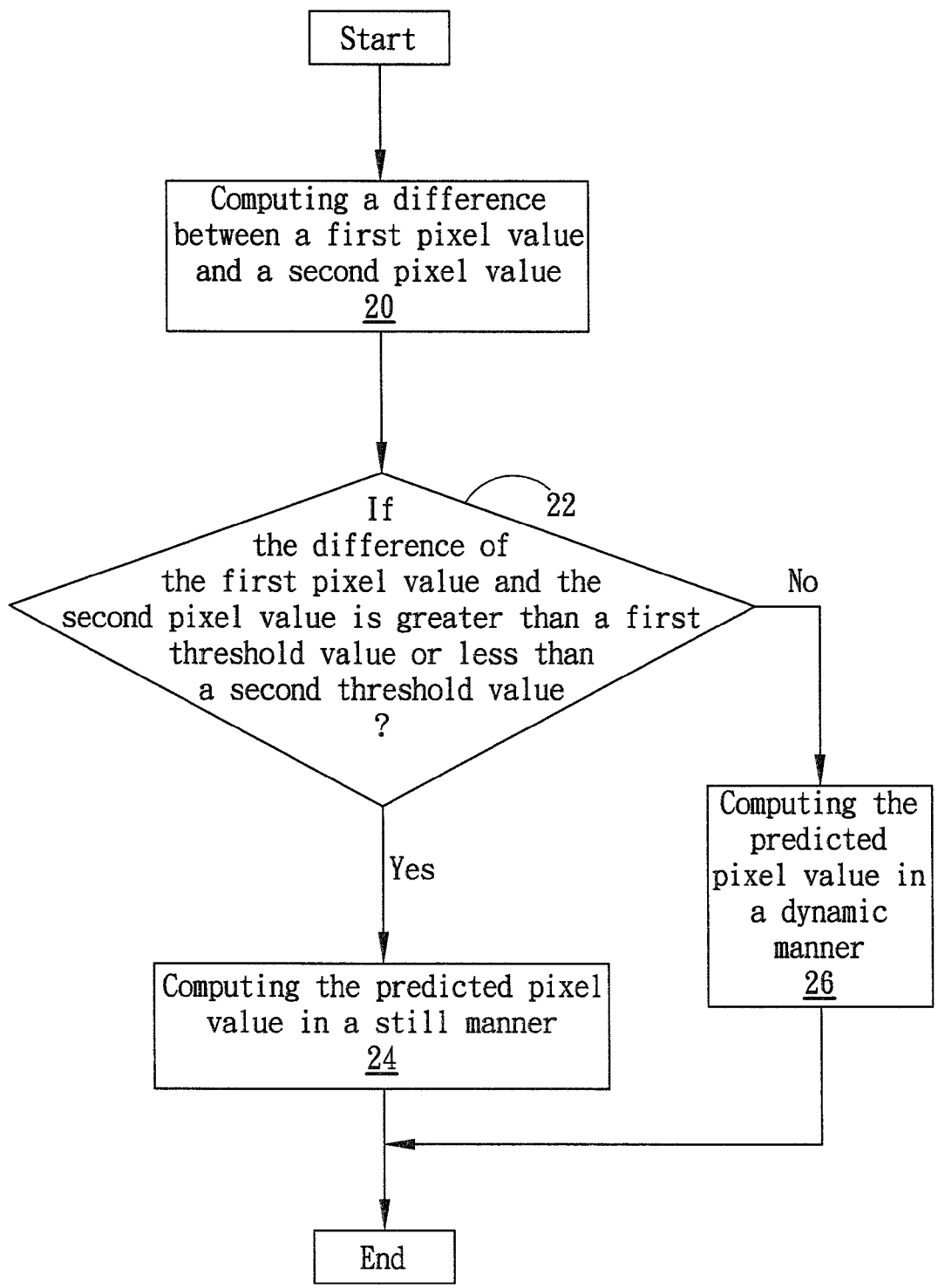
FIG. 2 shows a flow chart of a deinterlacing method for a digital motion picture according to one embodiment of the present invention.

FIG. 2 shows a flow chart of a deinterlacing method for a digital motion picture according to one embodiment of the present invention, the method including the steps of: computing a difference between a first pixel value and a second pixel value (step 20); comparing the difference between the first pixel value and the second value with a first threshold value and a second threshold value respectively (step 22), in which the first threshold value is greater than the second threshold value; if the difference of the first pixel value and the second pixel value is greater than the first threshold value or less than the second threshold value, then determining that a predicted pixel lies in an artificial horizontal line and computing a luminance value of the predicted pixel in a still manner (step 24); if the difference of the first pixel value and the second pixel value is between the first threshold value and the second threshold value, then determining that the predicted pixel does not lie in an artificial horizontal line and computing the luminance value of the predicted pixel in a dynamic manner (step 26). Computing a pixel value in a dynamic (respectively still) manner means, for example, computing it by using a Bob (respectively Weave) method.

Figure 3:
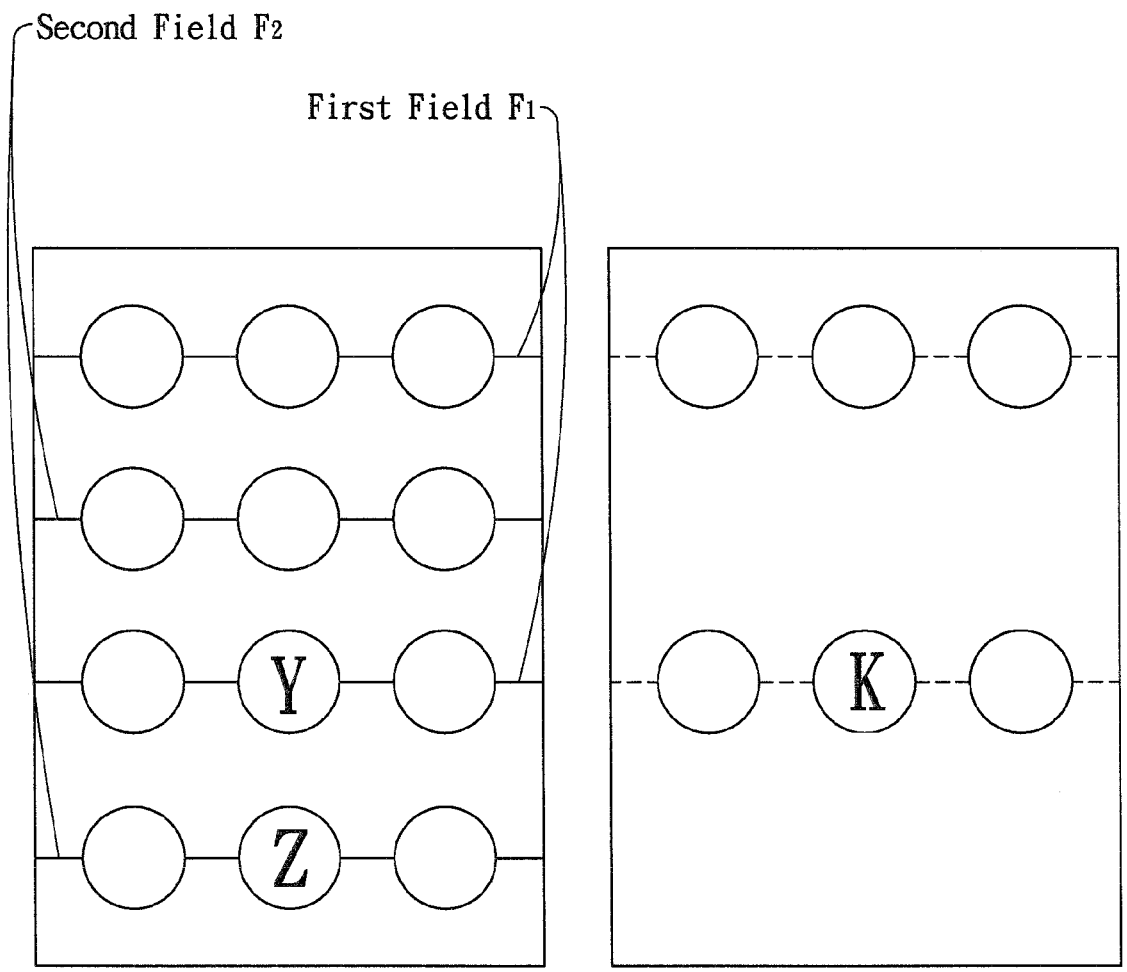
FIG. 3 illustrates a temporal and spatial relationship among the specific pixels mentioned in embodiment of FIG. 2.

FIG. 3 illustrates a temporal and spatial relationship among the specific pixels mentioned in embodiment of FIG. 2. Particularly, FIG. 3 shows the first field F1 and the second field F2 which are fields in an original interlaced frame, as well as the predicted field Fpr resulting from the deinterlacing operation. FIG. 3 also shows the first pixel Y (corresponding to the first pixel mentioned in FIG. 2), the second pixel Z (corresponding to the second pixel mentioned in FIG. 2), and the predicted pixel K (corresponding to the predicted pixel mentioned in FIG. 2) respectively lying in the first field F1, the second field F2, and the predicted field Fpr. The predicted Fpr and the second field F2 may be combined to form a new non-interlaced (i.e. progressive) frame. The circles in the figure represent pixels. Pixels connected with solid lines represent pixels in the original fields (F1 or F2); while pixels connected with dotted lines represent pixels in the predicted field Fpr. The first field F1 and the second field F2 are original interlaced fields with adjacent temporal sequences. In other words, if the first field F1 is an even field, then the second field will be an odd field; on the contrary, if the first field F1 is an odd field, then the second field will be an even field. The first pixel Y, the second pixel Z and the predicted pixel K are pixels having the same or approximate vertical coordinate and horizontal coordinate in respective fields. In a preferred embodiment according to the present invention, the first pixel Y may be represented by the field coordinate (m,n), which means the first pixel Y is the nth pixel lying in the mth scan line of the first field F1; and both the second pixel Z and the predicted pixel K also have the field coordinate (m,n) in the fields F2 and Fpr respectively.

Step 22, 24, and 26 generally aim to determine if the predicted pixel K lies in an artificial horizontal line and to perform corresponding actions. The pixel lying in an artificial horizontal line is often misjudged as a point located on a dynamic object by a traditional dynamic pixel detection method, therefore it tends to be predicted in a dynamic manner. As mentioned above, which may result in unexpected disappearing of some horizontal lines. It should be noted that steps 22, 24, and 26 are only for examples instead of any limitation to the method for determining if a predicted pixel lies in an artificial horizontal line or not. It will not depart from the scope of the present invention as long as a pixel lying in an artificial horizontal line is detected according to the relationship among the first pixel value, the second pixel value, the first threshold value and the second threshold value as defined in the description with respect to FIG. 2.

Figure 4:
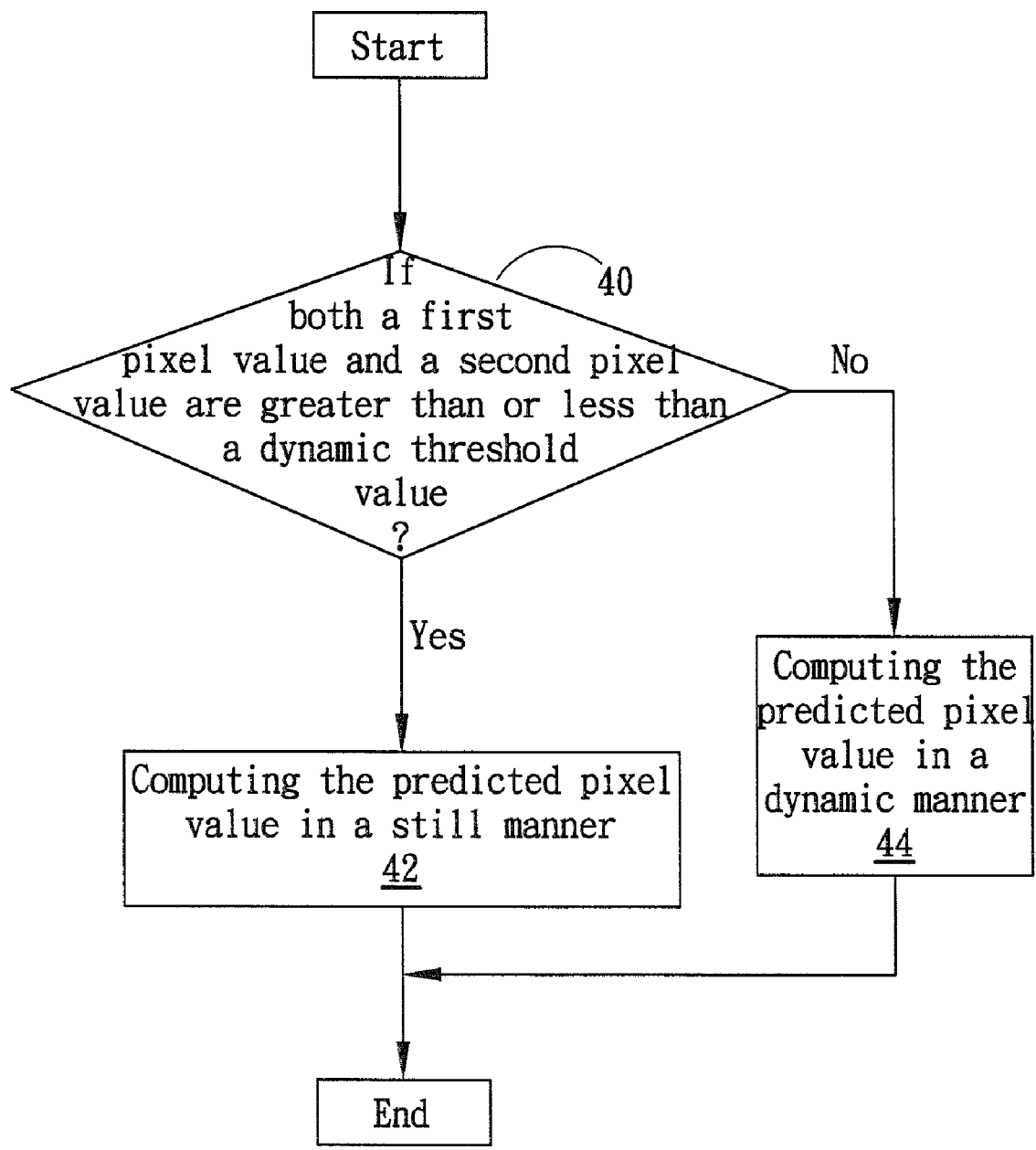
FIG. 4 shows a flow chart of a deinterlacing method for a digital motion picture according to another embodiment of the present invention.

FIG. 4 shows a flow chart of a deinterlacing method for digital motion picture according to another embodiment of the present invention, the method including the steps of: comparing respectively a first pixel value and a second pixel value with a dynamic threshold value (step 40); if both the first pixel value and the second pixel value are greater than or less than the dynamic threshold value, then computing a luminance value of a predicted pixel in a still manner (step 42); and on the contrary, if the larger one of the first pixel value and the second pixel value is greater than the dynamic threshold value and the smaller one thereof is less than the dynamic threshold value, then computing the luminance value of the predicted pixel in a dynamic manner (step 44).

In the embodiment, the temporal and spatial relationships among the first pixel, the second pixel, and the predicted pixel are the same as what shown in FIG. 3 and the description thereof.

Figure 5:
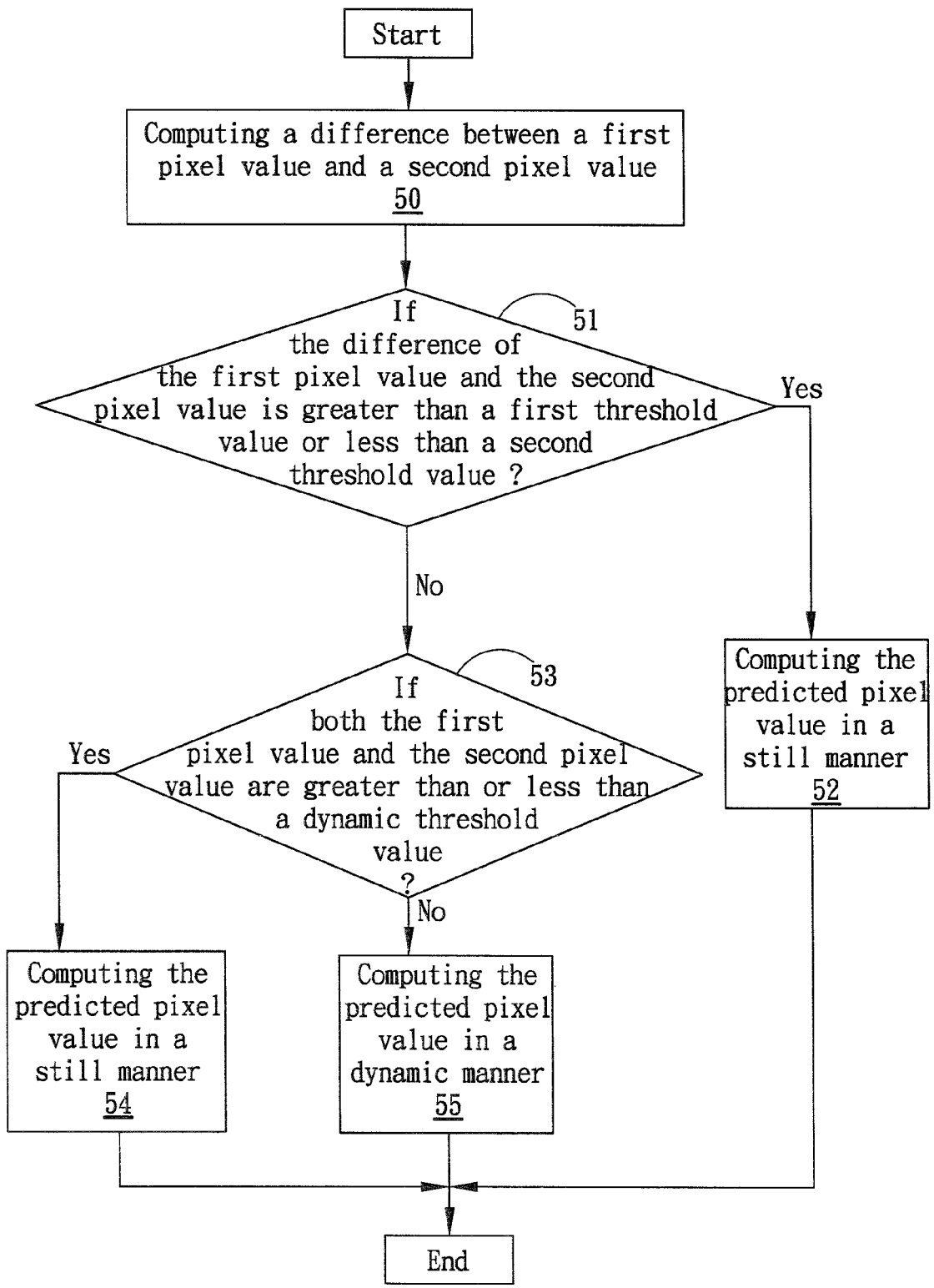
FIG. 5 shows a flow chart of a deinterlacing method for a digital motion picture according to yet another embodiment of the present invention.

FIG. 5 shows a flow chart of a deinterlacing method for digital motion picture according to yet another embodiment of the present invention. The method basically combines the methods shown in FIG. 2 and FIG. 4 and includes the steps of: computing a difference between a first pixel value and a second pixel value (step 50); comparing the difference between the first pixel value and the second pixel value with a first threshold value and a second threshold value respectively (step 51); if the difference of the first pixel value and the second pixel value is greater than the first threshold value or less than the second threshold value, then determining that a predicted pixel lies in an artificial horizontal line and computing a luminance value of the predicted value in a still manner (step 52); but if the difference is fallen between the first threshold value and the second threshold value, then comparing respectively the first pixel value and the second pixel value with a dynamic threshold value (step 53); if both the first pixel value and the second pixel are greater than or less than the dynamic threshold value, then computing the luminance value of the predicted pixel in a still manner (step 54); and if the larger one of the first pixel value and the second pixel value is greater than the dynamic threshold and the smaller one thereof is less than the dynamic threshold value, then computing the luminance value of the predicted pixel in a dynamic manner (step 55).

In this embodiment, the step regarding determining that the predicted pixel lies in an artificial horizontal line or not is executed first. If the predicted pixel is determined to lie in an artificial horizontal line, then computing the luminance value in a still manner. Otherwise, the method shown in FIG. 4 is used to compute the luminance value of the predicted pixel. According to another embodiment of the present invention, the method shown in FIG. 4 is executed first to determine that if the predicted pixel is a dynamic pixel. If the predicted pixel is determined to be a dynamic pixel, then the method shown in FIG. 2 is used to determine that if the predicted pixel lies in an artificial horizontal line or not.

Computing the luminance value of the predicted pixel in a still manner typically uses the method called Weave to estimate the predicted pixel value based on pixel values in the previous field (such as first field F1) and in the current field (such as second field F2). According to one embodiment of the present invention, computing the luminance value of the predicted pixel in a still image manner calculates a linear combination of a first pixel value and a second pixel value defined above, in which the weights of the first and the second pixel value are both 50%.

Computing the luminance value of the predicted pixel in a dynamic manner typically uses the method called Bob to estimate the predicted pixel value based on pixel values in the current field. According to one embodiment of the present invention, computing the luminance value of the predicted pixel in a dynamic manner set the predicted pixel value equal to the second pixel value defined above.

Figure 6:
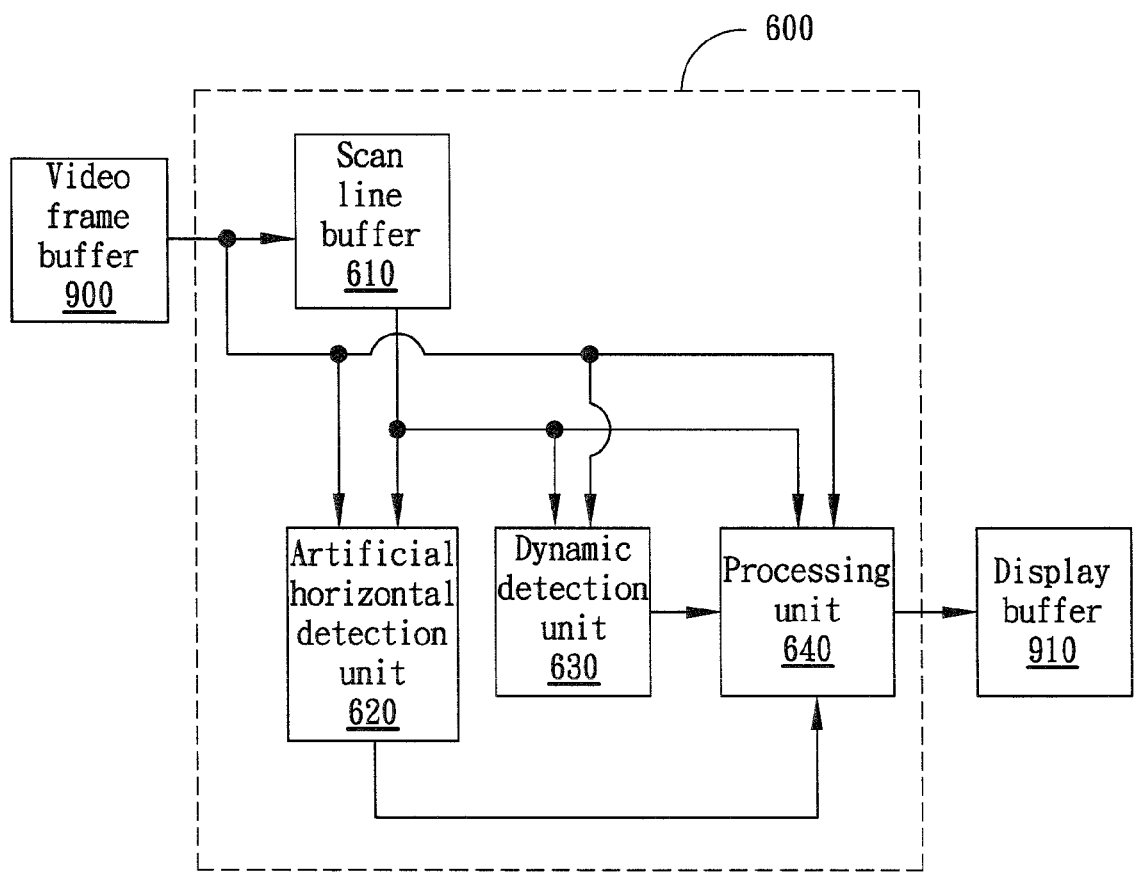
FIG. 6 shows a deinterlacing apparatus for a digital motion picture according to one embodiment of the present invention.

FIG. 6 shows a deinterlacing apparatus 600 for digital motion picture according to one embodiment of the present invention. The deinterlacing apparatus 600 includes a scan line buffer 610, an artificial horizontal detection unit 620, a dynamic detection unit 630, and a processing unit 640. FIG. 6 also shows a video frame buffer 900 and a display buffer 910 to illustrate the connection between the deinterlacing apparatus 600 and other units of the same system or external devices. The scan line buffer 610 connecting to the video frame buffer 900, the artificial horizontal line detection unit 620, the dynamic detection unit 630, and the processing unit 640 receives and saves the image data from the video frame buffer 900 and provides the pixel data (or scan lines) of a previous field in temporal sequence for further processing by the artificial horizontal line detection unit 620, the dynamic detection unit 630, and the processing unit 640. The artificial horizontal line detection unit 620 connecting to the video frame buffer 900, the scan line buffer 610 and the processing unit 640 determines that if a predicted pixel lies in an artificial horizontal line or not based on the current field pixels in the video frame buffer 900 and the previous field pixels in the scan line buffer 610 and outputs the result to the processing unit 640. The dynamic detection unit 630 connecting to the video frame buffer 900, the scan line buffer 610 and the processing unit 640 determines that if the predicted pixel lies on a dynamic object (i.e., a dynamic pixel) based on the current field pixels in the video frame buffer 900 and the previous field pixels in the scan line buffer 610 and outputs the result to the processing unit 640. The processing unit 640 connecting to the video frame buffer 900, the scan line buffer 610, the artificial horizontal line detection unit 620, the dynamic detection unit 630 and the display buffer 910 uses a dynamic method (Bob) or a still method (Weave) to process the current field information in the video frame buffer 900 and the previous field information in the scan line buffer 610 according to the output of the artificial horizontal line detection unit 620 and the dynamic detection unit 630, so as to compute the luminance value of the predicted pixel which is then transferred to the display buffer 910.

The artificial horizontal line detection unit 620 may use the method disclosed in FIG. 2 to determine if the predicted pixel during deinterlacing lies in an artificial horizontal line or not. In other words, the artificial horizontal line detection unit 620 may determine if the predicted pixel lies in an artificial horizontal line according to the relationship among the previous field pixel value, the current field pixel value, the first threshold value and the second threshold value. For example, when the difference between the previous field pixel value and the current field pixel value is greater than the first threshold value or less than the second threshold value, then the predicted pixel is determined to lie in an artificial horizontal line.

The dynamic detection unit 630 may use the method disclosed in FIG. 4 to determine that if the predicted pixel during deinterlacing is a dynamic pixel or not. In other words, the dynamic detection unit 630 may determine if the predicted pixel is a dynamic pixel or not according to the relationship among the previous field pixel value, the current field pixel value and a dynamic threshold value. For example, when the larger one of the previous field pixel value and the current field pixel value is greater than the dynamic threshold value and the smaller one thereof is less than the dynamic threshold value, then the predicted pixel is determined to be a dynamic pixel.

The processing unit 640 determines the manner to estimate the predicted pixel according to the output of the artificial horizontal line detection unit 620 and the dynamic detection unit 630. It may give the first priority to the output of the artificial horizontal line detection unit 620, which means when the artificial horizontal line detection unit 620 determines that the predicted pixel lies in an artificial horizontal line, then the predicted pixel is estimated in still manner, on the other hand, when the artificial horizontal line detection unit 620 does not determine that the predicted pixel lies in an artificial horizontal line, then the output of the dynamic detection unit 630 is referred to determine the manner to estimate the predicted pixel. According to another embodiment of the present invention, the processing unit 640 gives the high priority to the dynamic detection unit 630, that is to say, when the predicted pixel is determined to be a dynamic pixel, then the output of the artificial horizontal line detection unit 620 will be used to determine the manner to estimate the predicted pixel. Moreover, the processing unit 640 may use the still manner or the dynamic manner disclosed above to compute the predicted pixel value. For example, for a static pixel, a linear combination of the previous field pixel value and current field pixel value may be used as the predicted value; for a dynamic pixel, the predicted pixel value may be directly set to the current field pixel value.

Note that the temporal and spatial relationship among the original field pixels and the predicted pixel shown in FIG. 3 may also be applied to the embodiment of FIG. 6, in which the previous field pixel and the current field pixel may correspond to the second pixel Z and the first pixel Y respectively.

The video frame buffer 900 and the scan buffer 610 may be a standalone memory component, such as a dynamic random access memory (DRAM), or part thereof. The artificial horizontal line detection unit 620, the dynamic detection unit 630 and the processing unit 640 may be logic modules in an application specific integrated circuit (ASIC) or program modules for a digital signal processor (DSP). The display buffer 910 may be a video memory buffer lying in the same system or even in the same chip including the deinterlacing apparatus for digital motion picture of the present invention, or it may be a video memory buffer of an external video device.

The above specific embodiments are probably practical examples. It will be appreciated by those skilled in the art that various modifications may be made without departing from the scope of the present invention, which is intended to be limited solely by the appended claims.

What is claimed is:

1. A deinterlacing method for a digital motion picture, the method comprising the steps of:
    determining if a predicted pixel lies in an artificial horizontal line according to a relationship among a first pixel value, a second pixel value, a first threshold value and a second threshold, the first pixel and the second pixel respectively lying in a first field and a second field which are in an interlace relationship and in adjacent temporal sequences, and the first threshold value being greater than the second threshold value, wherein when an absolute value of a difference between the first pixel value and the second pixel value is greater than the first threshold value or less than the second threshold value, the predicted pixel is determined to lie in the artificial horizontal line; and
    computing a luminance value of the predicted pixel in a still manner if the predicted pixel is determined to lie in the artificial horizontal line,
    wherein the predicted pixel lies in a predicted field which is combined with the second field to form a new non-interlaced frame, and wherein the first pixel, the second pixel and the predicted pixel all have the same field coordinates.

2. The method of claim 1, wherein the still manner sets the luminance value of the predicted pixel to a linear combination of the first pixel value and the second pixel value.

3. The method of claim 2, wherein said linear combination comprises 50% of the first pixel value and 50% of the second pixel value.

4. The method of claim 1, further comprising:
    determining if the predicted pixel is a dynamic pixel or not according to a relationship among the first pixel value, the second pixel value and a dynamic threshold value, wherein when the larger one of the first pixel value and the second pixel value is greater than the dynamic threshold value and the smaller one of the first pixel value and the second pixel value is less than the dynamic threshold value, the predicted pixel is determined to be the dynamic pixel; and
        if the predicted pixel is determined to be a dynamic pixel, then computing the luminance value of the predicted pixel in a dynamic manner, otherwise computing the luminance value of the predicted pixel in the still manner.

5. The method of claim 4, wherein the dynamic manner sets the luminance value of the predicted pixel to the second pixel value.

6. The method of claim 1, further comprising:
    computing the luminance value of the predicted pixel in a dynamic manner if the predicted pixel is not determined to lie in the artificial horizontal line.

7. A deinterlacing method for a digital motion picture, the method comprising the steps of:
    determining if a predicted pixel is a dynamic pixel according to a relationship among a first pixel value, a second pixel value and a dynamic threshold, the first pixel and the second pixel respectively lying in a first field and a second field which are in an interlace relationship and in adjacent temporal sequences, wherein when the larger one of the first pixel value and the second pixel value is greater than the dynamic threshold value and the smaller one of the first pixel value and the second pixel value is less than the dynamic threshold value, the predicted pixel is determined to be a dynamic pixel; and
    if the predicted pixel is determined to be a dynamic pixel, then computing the luminance value of the predicted pixel in a dynamic manner, otherwise computing the luminance value of the predicted pixel in a still manner,
    wherein the predicted pixel lies in a predicted field which is combined with the second field to form a new non-interlaced frame, and wherein the first pixel, the second pixel and the predicted pixel all have the same field coordinates.

8. The method of claim 7, wherein the still manner sets the luminance value of the predicted pixel to a linear combination of the first pixel value and the second pixel value.

9. The method of claim 7, wherein said linear combination comprises 50% of the first pixel value and 50% of the second pixel value.

10. The method of claim 9, wherein the dynamic manner sets the luminance value of the predicted pixel to the second pixel value.

11. A deinterlacing apparatus for a digital motion picture, comprising:
    an artificial horizontal line detection unit configured to determine if a predicted pixel lies in an artificial horizontal line or not according to a relationship among a first pixel value, a second pixel value, a first threshold value and a second threshold value, the first pixel and the second pixel respectively lying in a first field and a second field which are in an interlace relationship and in adjacent temporal sequences, and the first threshold value being greater than the second threshold value, wherein when an absolute value of a difference between the first pixel value and the second pixel value is greater than the first threshold value or less than the second threshold value, the predicted pixel is determined to lie in the artificial horizontal line;
    a scan line buffer connecting to a video buffer for storing scan lines comprising the first pixel value, wherein the video buffer is configured to store the second field comprising the second pixel; and
    a processing unit, configured to compute a luminance value of the predicted pixel in a still manner if the predicted pixel is determined to lie in the artificial horizontal line by the artificial horizontal line detection unit,
    wherein the predicted pixel lies in a predicted field which is combined with the second field to form a new non-interlaced frame, and wherein the first pixel, the second pixel and the predicted pixel all have the same field coordinates.

12. The apparatus of claim 11, wherein the still manner sets the luminance value of the predicted pixel to a linear combination of the first pixel value and the second pixel value.

13. The apparatus of claim 12, wherein said linear combination comprises 50% of the first pixel value and 50% of the second pixel value.

14. The apparatus of claim 11, further comprising a dynamic detection unit configured to determine if the predicted pixel is a dynamic pixel according to a relationship among the first pixel value, the second pixel value and a dynamic threshold, wherein when the larger one of the first pixel value and the second pixel value is greater than the dynamic threshold value and the smaller one of the first pixel value and the second pixel value is less than the dynamic threshold value, the predicted pixel is determined to be the dynamic pixel, wherein the processing unit computes the luminance value of the predicted pixel in a dynamic manner when the predicted pixel is determined to be a dynamic pixel by the dynamic detection unit.

15. The apparatus of claim 14, wherein the dynamic manner sets the luminance value of the predicted pixel to the second pixel value.

16. A method for determining if a pixel is static, dynamic, or in an artificial line, the method comprising the steps of:
- computing a difference between a pixel value and a neighboring pixel value;
- determining the pixel to be in an artificial line when said difference is greater than a first threshold value;
- determining the pixel to be dynamic when said difference is less than the first threshold value but greater than a second threshold value; and
- determining the pixel to be static when said difference is less than the second threshold value,
- wherein the first threshold value is greater than the second threshold value.

* * * * *